(12) United States Patent
Doten (10) Patent No.: US 9,498,662 B2
(45) Date of Patent: Nov. 22, 2016

(54) POLYMER GEL EMULSION INJECTION SYSTEM

(71) Applicant: Leonard E. Doten, Cold Springs, CA (US)

(72) Inventor: Leonard E. Doten, Cold Springs, CA (US)

( * ) Notice: Subject to any disclaimer, the term of this patent is extended or adjusted under 35 U.S.C. 154(b) by 305 days.

(21) Appl. No.: 14/183,299

(22) Filed: Feb. 18, 2014

(65) Prior Publication Data

US 2015/0231428 A1 Aug. 20, 2015

(51) Int. Cl.
*A62C 4/00* (2006.01)
*A62C 5/00* (2006.01)
*B64D 1/16* (2006.01)

(52) U.S. Cl.
CPC ............... *A62C 5/008* (2013.01); *B64D 1/16* (2013.01)

(58) Field of Classification Search
CPC ................................ A62C 5/008; B64D 1/16
USPC ...... 169/52, 44, 14; 239/171, 304, 308, 306, 239/307, 407; 137/899.2, 888, 893, 599.01, 137/896; 60/413; 222/386, 386.5, 389
See application file for complete search history.

(56) References Cited

U.S. PATENT DOCUMENTS

| | | | |
|---|---|---|---|
| 2,556,239 A | | 6/1951 | Tuve |
| 3,220,482 A | * | 11/1965 | Eveleth .................... B64D 1/16 141/21 |
| 3,714,987 A | * | 2/1973 | Mattson .................... B64D 1/16 137/533.13 |
| 3,754,601 A | * | 8/1973 | Linkewich ............... B64D 1/16 169/53 |
| 3,897,829 A | * | 8/1975 | Eason ....................... B64D 1/16 169/53 |
| 4,172,499 A | * | 10/1979 | Richardson .............. B64D 1/16 169/14 |
| 4,208,031 A | | 6/1980 | Jonak |
| 4,313,465 A | * | 2/1982 | Holzem .................. G05B 11/18 137/599.07 |
| 4,722,363 A | * | 2/1988 | Allyn .................... G05D 11/006 137/13 |
| 6,684,959 B1 | * | 2/2004 | Juidici ...................... A62C 5/02 169/13 |
| 2002/0117223 A1 | * | 8/2002 | Henry ................... F16L 55/053 138/30 |
| 2008/0035201 A1 | * | 2/2008 | Roberts .................... A62C 5/02 137/5 |
| 2010/0059237 A1 | | 3/2010 | Cordani |
| 2012/0199356 A1 | | 8/2012 | Nichols |
| 2013/0039785 A1 | * | 2/2013 | Davidson ............ F04D 29/2205 417/410.1 |
| 2013/0112907 A1 | * | 5/2013 | Doten .................... B01F 5/0415 252/2 |

* cited by examiner

*Primary Examiner* — Kevin Murphy
*Assistant Examiner* — Nicole Wentlandt
(74) *Attorney, Agent, or Firm* — Heisler & Associates (57) ABSTRACT

An injection system for polymer gel emulsion is powered to cause polymer gel emulsion to be injected into high energy water entering a scooping intake, such as that on a firefighting aircraft. To energize the polymer gel emulsion, an accumulator is interposed between a polymer gel emulsion injection line and the water scooping intake. High energy water is routed to one side of the accumulator where this high energy water acts on the accumulator to move a movable element within the accumulator which pressurizes and expels polymer gel emulsion into the polymer gel emulsion injection line for injection of the polymer gel emulsion through a junction and into a mixed supply line of water and polymer gel emulsion downstream of a junction. The mixed polymer gel emulsion and water are routed to a tank for storage until ready for use.

23 Claims, 7 Drawing Sheets

POLYMER GEL EMULSION INJECTION SYSTEM

FIELD OF THE INVENTION

The following invention relates to dosing and injection systems for injecting polymer gel emulsion into water, such as for producing a polymer and water mixture for enhanced fire fighting effectiveness. More particularly, this invention relates to polymer gel emulsion dosing and injection systems for inputting the desired amount of polymer gel emulsion into water before mixing that require little or no power to operate, especially so that they are well suited for placement on fire fighting aircraft where available power is limited.

BACKGROUND OF THE INVENTION

When combatting wildfire from the air, various tools can be utilized. One common tool is to load an appropriately configured aircraft with wildland fire chemicals, fly the aircraft over the fire or an area adjacent the fire to be protected, and discharge the fire chemical from the aircraft. While such fire chemicals are quite effective in suppressing wildfire, the aircraft must travel to a reloading base and return to the location of the wildfire before additional loads can be dropped, decreasing the effectiveness of such aircraft proportional to the distance the reloading base is from the fire and the time such reloading takes.

In many instances bodies of water are available in the area where the wildfire is occurring. Helicopters can be utilized with buckets suspended therefrom which can be loaded with water and then flown to the site of the wildfire and released. Water is not as effective as fire retardants or suppressants in combatting wildfire. Also, helicopters have a lesser payload capacity than airplanes.

It is also known to utilize airplanes for dropping water onto wildfires. Such airplanes are configured to skim over a body of water to load tanks therein with water. Such airplanes then fly to the site of the fire where the water can be released.

Water's effectiveness as a fire suppressant can be significantly enhanced by adding a suppressant polymer to the water. One such polymer material is provided under the trademarks FIREWALL ULTRA, provided by BroadRange Wildland Fire Chemicals of Cold Springs, Calif. and FIRE-WALL II, provided by Eco FireSolutions of Carmichael, Calif. One known system for activating the polymer gel emulsion with water uses the hydrodynamic forces of the water scooped into the aircraft to achieve polymer gel emulsion activation and mixing with water. Such a system is described in Published Patent Application No. 2013/0112907 incorporated herein by reference in its entirety.

A pump is typically used to provide the required "dose" of polymer to a tank load of water in various polymer gel emulsion activation and mixing systems on aircraft. This pump must be powered, typically form an electrical system of the aircraft that is already heavily taxed. Thus, a need exists to power the polymer dosing procedure in a manner that minimizes the burden on the aircraft.

Such dosing systems are known in the prior art to have a dosing pump to supply pressure for injection of the polymer gel emulsion into the water. This pump would typically be a particularly high energy pump, especially when water collection and water with polymer gel emulsion occurs when the water is being collected in a scooping intake of an aircraft. In particular, the water is particularly high energy due to the velocity of the aircraft line over the water. The polymer gel emulsion dosing pump must generate sufficient pressure so that the polymer gel emulsion will be provided into the water, and with an appropriate amount, rather than high energy water flowing back into the dosing system. Even if a check valve is provided, the pump must have sufficient power to open the check valve and introduce the polymer gel emulsion into the high energy water stream.

Furthermore, a relatively short time period is provided for a relatively large dose of polymer gel emulsion to be introduced into the water when the water is brought into the system through a scooping intake. With only a short amount of time available, the pump must advance a relatively large amount of polymer gel emulsion in a relatively short amount of time, tending to increase the power requirements for the pump during this surge of required activity.

These performance demands on the pump tend to increase an amount of power required to operate the pump, and also tends to increase the size (and hence also weight) of the pump itself and/or the complexity of the pump. In an aircraft environment available power to operate the pump is limited because substantially all available power is being supplied to the vehicle to provide motive power for the vehicle and to power other various onboard systems. Furthermore, on an aircraft weight and available space are exceptionally limited so that the aircraft can maintain its performance specifications and maximize payload delivery and associated fire fighting capabilities. Accordingly, a need exists for an alternative to a dosing pump, or at a minimum systems which minimize the size, complexity and energy requirements of any such dosing pump.

SUMMARY OF THE INVENTION

With this invention polymer gel emulsion injection is entirely (or at least partially) powered by an energy transfer which uses energy associated with water entering a scooping intake, such as that contained in a fire fighting aircraft. In particular, an accumulator is provided onboard the aircraft which also includes the scooping intake, storage for polymer gel emulsion, a junction where the polymer gel emulsion and water are brought together for mixing, and a mixed product tank for storage of the polymer gel emulsion and water mixture before it is released at a fire fighting location.

The accumulator is configured to have a chamber therein where polymer gel emulsion can accumulate. The accumulator is thus in fluid communication with an injection line extending from the polymer gel emulsion storage and to the junction with the water line (or otherwise in fluid communication with the polymer gel emulsion supply). The accumulator is biased toward a higher volume configuration for polymer gel emulsion collection, but can change in volume to discharge polymer gel emulsion. Thus, the accumulator can "accumulate" an amount of polymer gel emulsion through action of such a biasing element, and then can flexibly release a portion of this polymer gel emulsion back into the polymer gel injection line. The accumulator is configured to exhibit a pressure that correlates with forces acting upon the accumulator when the gel emulsion is dispensed. The pressurized gel emulsion from the accumulator thus pressurizes an injection line which feeds the gel concentrate into the main line from the scooping intake, for mixing of the gel with the water before entering into the mixed product tank.

To power the accumulator, a control line passes from the main line downstream of the scooping intake to the accumulator. This control line has a pressure associated with water contained therein which correlates with the pressure of the water in the main line when scooped into the scooping intake. This pressure can be enhanced if desired, such as through utilization of a pump, or through configuration of the accumulator appropriately, such as by having a larger volume of water acting on the accumulator than a volume of polymer gel emulsion being acted upon.

A dose control valve is also preferably associated with the accumulator which controls an amount of movement of the accumulator when discharging the polymer gel emulsion. This dosing control valve can be in the form of one or more solenoids and associated orifices which limit an amount of water which can act upon the accumulator, or can be located between the accumulator and the polymer gel emulsion injection line to limit an amount of pressurized polymer gel emulsion from the accumulator that can pass into the injection line.

As an alternative to the pump to boost a pressure of water fed through the control line to the accumulator, or in addition thereto, the injection line can join with the main line at the junction through a venturi. With such a venturi at the junction, a degree of suction is generated by increasing a velocity of water through the venturi, so that the polymer gel emulsion injected at the junction is assisted by the venturi to some extent and does not need to be pressurized to as great an extent to achieve the desired dosing.

The accumulator can take different forms with particular embodiments including a piston accumulator or a flexible barrier accumulator. With the piston accumulator an inlet chamber for water is provided spaced from an outlet chamber for polymer gel emulsion. A first piston resides within the inlet chamber and a second piston resides within the outlet chamber. A shaft or other element joins the two pistons together. A spring or other biasing member biases the pistons toward the inlet of the accumulator on the main line side of the system.

With the flexible barrier accumulator a common housing supports both an inlet chamber and an outlet chamber with a flexible barrier within the housing dividing the two chambers from each other. The barrier can be biased (such as by a spring) toward the inlet chamber which contains water from the main line. With either the piston accumulator or the flexible barrier accumulator, the accumulator is biased towards a first configuration which draws polymer gel emulsion into the accumulator. When the scooping intake comes into contact with water, high flow rate water passes into the main line. Some of this water is routed through the control line to the inlet of the accumulator. This high pressure water acts upon the movable element within the accumulator sufficient to overcome force of the spring or other biasing element within the accumulator to move the movable barrier within the accumulator and cause polymer gel emulsion to be pressurized and discharged out of the accumulator and into the polymer gel emulsion injection line.

The entire polymer gel emulsion injection line is pressurized by the accumulator or other energy transfer, causing injection of polymer gel emulsion into the water at the junction. The combined polymer gel emulsion and water are then mixed, reacted and loaded into the tank. Such mixing and reaction can occur at the point of the junction itself to some extent, and can be further enhanced by high velocity routing of the mixture of polymer gel emulsion and water through elbows or other mixing elements along a high velocity supply line leading to the tank. As another alternative, mixing equipment can be contained within the tank or supply line sufficient to meet the requirements for proper mixing and activation of the polymer gel emulsion and water mixture. An amount of polymer gel emulsion injected into the water can be controlled by dose control valves on either the inlet side or the outlet side of the accumulator so that a desired amount of polymer gel emulsion is mixed with the water at the junction to meet the particular desires of the user.

OBJECTS OF THE INVENTION

Accordingly, a primary object of the present invention is to provide a system for powering the injection of polymer gel emulsion into water.

Another object of the present invention is to provide an energy efficient polymer gel emulsion injection system for dosing polymer gel emulsion into water.

Another object of the present invention is to provide a system for injecting polymer gel emulsion into water in a firefighting aircraft which requires a smaller dosing pump than would otherwise be required or no dosing pump at all.

Another object of the present invention is to provide a polymer gel emulsion injection system upon a firefighting aircraft which is lightweight and has little or no energy requirements from onboard aircraft power systems.

Another object of the present invention is to provide a polymer gel emulsion injection system which can be controlled to provide different mixture ratios of polymer gel emulsion and water.

Another object of the present invention is to provide a polymer gel emulsion injection system which utilizes an accumulator of simple and lightweight construction and which is powered at least partially by hydrodynamic forces associated with water entering a scooping intake of an aircraft.

Another object of the present invention is to provide a method for dosing polymer gel emulsion into water which is powered at least partially by energy in a water supply line, such as a scooping inlet of a fire fighting aircraft.

Other further objects of the present invention will become apparent from a careful reading of the included drawing figures, the claims and detailed description of the invention.

DESCRIPTION OF THE PREFERRED EMBODIMENT

Figure 1:
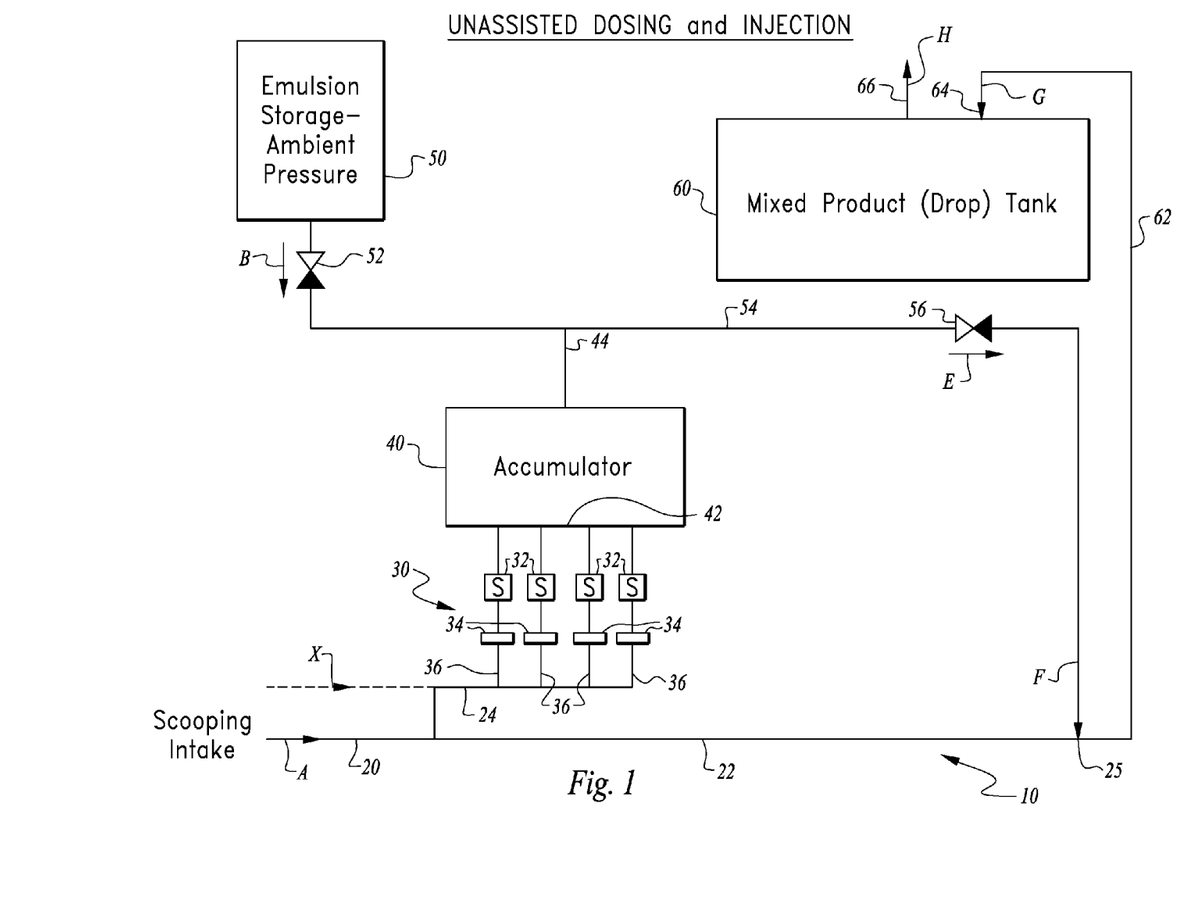
FIG. 1 is a schematic of the system of this invention according to a first embodiment where energy in water collected by a scooping intake is sufficient to power the system.

Referring to the drawings, wherein like reference numerals represent like parts throughout the various drawing figures, reference numeral 10 is directed to a system for polymer gel emulsion injection (FIG. 1). The system 10 pressurizes a source of polymer gel emulsion which can then pass through an injection line 54 leading to a junction 25 where the polymer gel emulsion is joined with water from a main line 22. The polymer gel emulsion is appropriately pressurized by an energy transfer, such as an accumulator 40 which is powered by energy from water entering a scooping intake 20 and into the main line 22 of the system 10. The polymer gel emulsion is sufficiently pressurized to cause the desired amount of dosing injection of the polymer gel emulsion into the water at the junction 25. The system 10 is particularly well suited for aircraft where water enters the system 10 through a scooping intake 20 and where the mixed gel emulsion and water are then stored in a tank 60, such as a drop tank for use in fighting fires.

Figure 8:
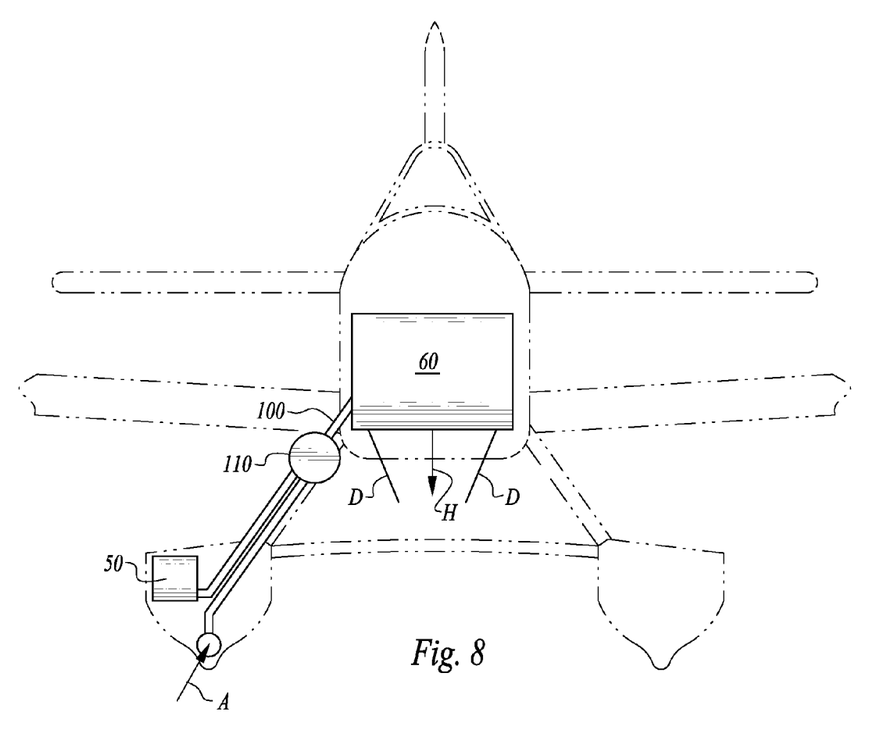
FIG. 8 is a front elevation partial schematic view of a fire fighting aircraft with a chemical tank and chemical mixer configured to add and mix chemicals with water before the water enters a tank of the fire fighting aircraft, according to this invention.

In essence, and with particular reference to FIGS. 1 and 8, basic details of the system 10 of this invention are described, according to a preferred embodiment. The system 10 includes an intake such as the scooping intake 20 where water enters the system (along arrow A). A polymer gel emulsion storage 50 is also provided, typically on the same aircraft which includes the scooping intake 20. An accumulator 40 is interposed between the storage 50 and the scooping intake 20. At least one dosing control valve 30 is associated with the accumulator 40, which can be adjusted to control an amount of polymer gel emulsion added to the water. The polymer gel emulsion storage 50 is routed along the injection line 54 to the junction 25 where the polymer gel emulsion is joined with water from the main line 22. A mixed supply line 62 leads from the junction 25 and feeds a mixture of the polymer gel emulsion and water to a mixed product tank 60 for storage and later dropping or other exiting from the tank 60.

More specifically, and with continuing reference to FIG. 1, specific details of the system 10 of this invention are described, according to this preferred embodiment. With this invention the system 10 is preferably entirely powered by energy contained within the water entering the scooping intake 20 (along arrow A). This energy is initially in the form of velocity associated with the aircraft moving relative to a body of water. The scooping intake 20 would typically be on a lower side of the aircraft and could be in the form of an inlet on a float of the aircraft (FIG. 8), a door D or other port opening on a belly of the aircraft, or some other intake on the aircraft. At least some component of the energy in the water, in addition to the velocity, could be in the form of pressure as well. Utilizing known methodologies and relationships such as those associated with the Bernoulli equation, or analogous energy equations, the energy of the water can be effectively resourced for purposes of this invention.

The scooping intake 20 leads (along arrow A) to a main line 22 which routes water, typically along a relatively straight line, to a junction 25. At this junction 25, polymer gel emulsion is added to the water (along arrow F). A high energy mixture then flows along a mixed supply line 62, typically about multiple elbows or other static mixing elements, to thoroughly mix and activate the polymer gel emulsion with the water before arrival at an entrance 64 into the tank 60 (at arrow G). Importantly, the water is sufficiently high in energy at the junction 25 that the polymer gel emulsion will tend to not have sufficient energy to pass into the mixed supply line 62 at the junction 25 (along arrow F of FIG. 1) unless the polymer gel emulsion is somehow energized to an energy level greater than energy in the water. Stated alternatively, the pressure of the polymer gel emulsion at the junction 25 must be greater than pressure in the main line 22 at the junction 25, so that the polymer gel emulsion will flow (along arrow F of FIG. 1) through the junction 25 to mix with the water along the mixed supply line 62.

To appropriately energize the polymer gel emulsion, the accumulator 40 is provided. The accumulator 40 has an inlet 42 on one side thereof and an outlet 44 on another side thereof. The inlet 42 is fed by a control line 24 extending from the main line 22. This control line 24 is thus filled with water from the scooping intake 20. As an alternative (or in addition), the control line 24 can extend from its own separate inlet (arrow X of FIG. 1) which can be configured similar to a pitot tube and positioned on the aircraft to be submerged during scooping, so that high pressure water enters this separate inlet with hydrodynamic energy (in the form of enhanced pressure and/or velocity resulting from the difference between aircraft velocity and the velocity of the body of water being scavenged).

Figure 2:
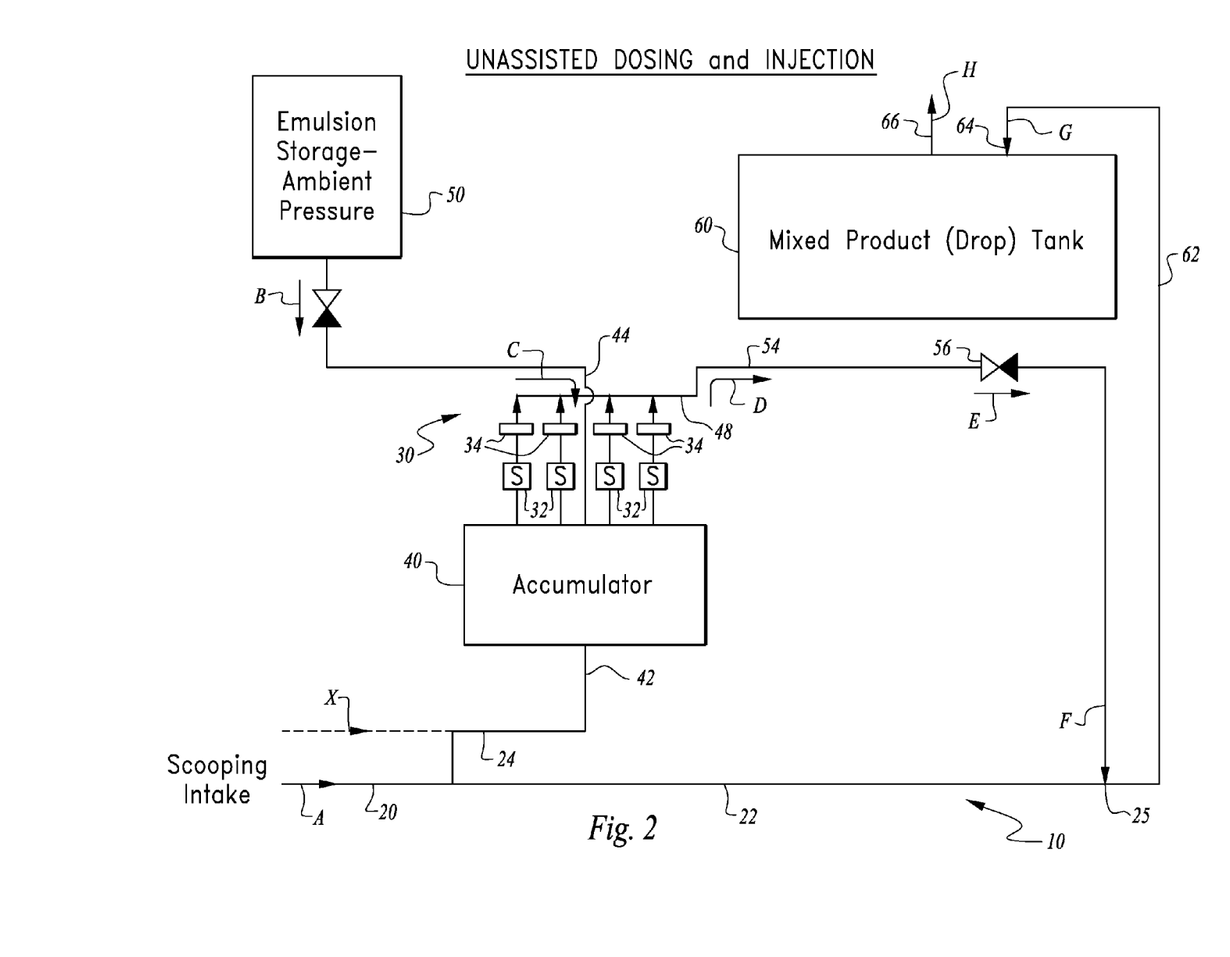
FIG. 2 is a schematic of an alternative embodiment of that which is shown in FIG. 1, with a dosing control valve located on an outlet side of an accumulator of the system, rather than an inlet side.

A dosing control valve 30 is preferably provided between the control line 24 and the inlet 42 of the accumulator 40. As an alternative, this dosing control valve 30 can be provided on the outlet 44 side of the accumulator 40 (FIG. 2 described below). The dosing control valve 30 is a valve, or set of valves, configured to control access of the water to the inlet 42 of the accumulator 40 and to also control an amount of such flow to the inlet 42 of the accumulator 40. In the exemplary embodiment depicted, multiple parallel valves 30 are provided between the control line 24 and the accumulator inlet 42. Each valve includes a solenoid 32 and a flow control orifice 34 in these parallel lines 36. The flow control orifices 34 are preferably replaceable/removable such as to provide repair as the orifices wear over time, or to allow for cleaning, or calibration or readjustment of the system 10. As an alternative to the flow control orifices 34, each parallel line 36 could have a diameter which matches that desired for associated flow control purposes (see FIG. 6). As another alternative, a single dosing control valve 30 could be utilized (see FIG. 7) which merely has a variable size orifice or other variable flow control element associated therewith.

The solenoid 32 or other actuatable element of the dosing control valve 30 are preferably coupled to a controller such as a controller which might be associated with a control panel of a pilot or other operator's station onboard the aircraft. Solenoids 32 can be opened to allow water flow therethrough or closed to prevent water flow therethrough. When multiple solenoids 32 are provided, different ones of the solenoids 32 can be opened to provide further flow control.

Figure 6:
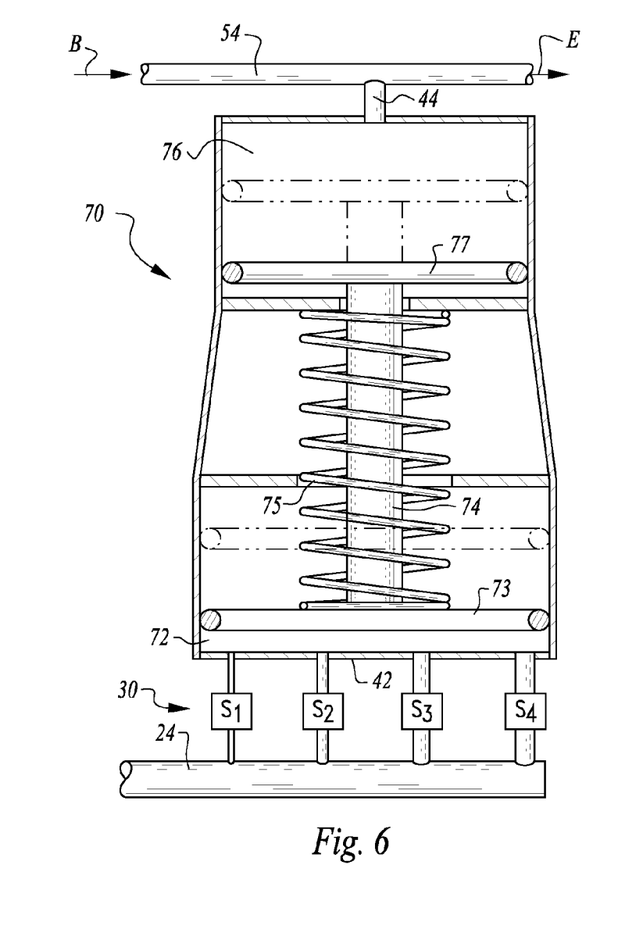
FIG. 6 is a full sectional plan view of a piston accumulator defining one form of accumulator for use in the system and method of this invention.

In one embodiment, each of the parallel lines 36 has a different sized flow control orifice 34 thereon. For instance, a first line 36 can have one unit of flow, a second line 36 can have two units of flow, a third line 36 can have four units of flow and a fourth line 36 can have eight units of flow (FIG. 6). By opening or closing different ones of the solenoids, a flow rate from one to fifteen units can be selected. For instance, if one unit of flow is desired, the first solenoid is opened and the other three solenoids are closed. If two units of flow are desired, the second solenoid is opened and all the other solenoids are closed.

If three units of flow are desired, the first and second solenoids are opened and the other solenoids are closed. If four units of flow are desired, the third solenoid is opened and the other solenoids are closed. If five units of flow are desired, the first and third solenoids are opened and the other solenoids are closed. If six units of flow are desired, the second and third solenoids are opened and the first and fourth solenoids are closed. If seven units of flow are desired, the first, second and third solenoids are opened and the fourth solenoid is closed.

If eight units of flow are desired, the fourth solenoid is opened as the other solenoids are closed. Should any other amount of flow be desired, appropriate ones of the solenoids are opened or closed, as can be readily discerned, including all four solenoids being opened so that fifteen units of flow are accommodated.

With particular reference to FIG. 2, details of an alternative location for the dosing control valve 30 is described. In this embodiment, the accumulator 40 has the inlet 42 (FIGS. 6 and 7) opposite the outlet 44. The dosing control valve(s) 30 is between the accumulator 40 and the gel injection line 54, similar solenoids 32, flow control orifices 34 and parallel lines can be utilized. In such an arrangement, preferably the line 44 initially acts as a feed (along arrow C) into the accumulator 40, separate from a discharge 48 downstream of the parallel lines and back into the polymer gel emulsion injection line 54 (along arrow D). The feed allows for flow of polymer gel emulsion into the accumulator (along arrow C of FIG. 1) while bypassing the parallel lines, and the discharge 48 allows for emulsion of flow from each of the parallel lines before a return together into the polymer gel emulsion injection line 54 (along arrow D of FIG. 1). Alternatively, each of the parallel lines could join the injection line 54 separately. Also, the parallel lines could feed back into the feed line 44. It would also be possible for polymer gel emulsion flow to occur through the dosing central valve(s) 30 both into and out of the accumulator 40.

Figure 7:
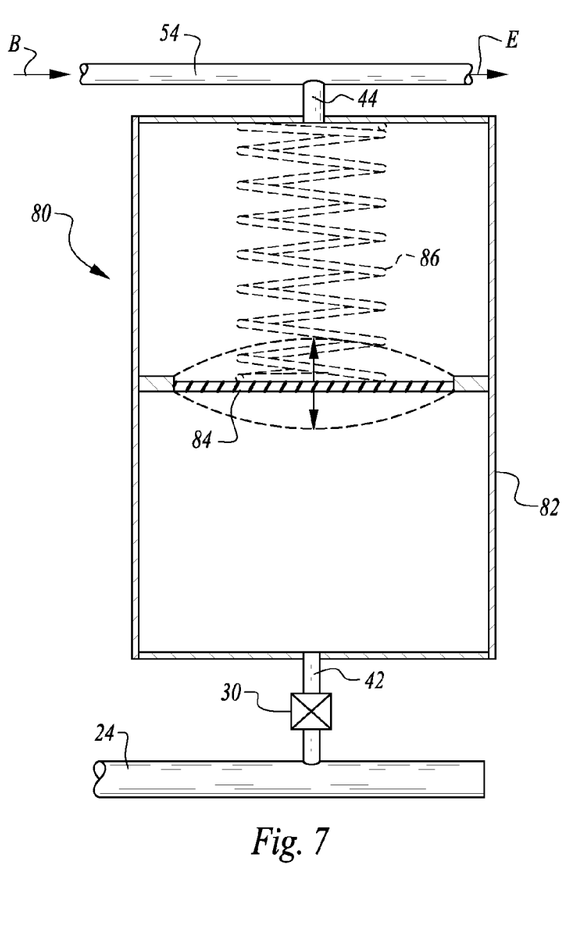
FIG. 7 is a full sectional plan view of a flexible barrier accumulator provided as an alternative to the piston accumulator of FIG. 5 for use as an accumulator within the system and method of this invention.

With particular reference to FIGS. 1, 6 and 7, details of the accumulator 40, are provided which describe a preferred form of energy transfer form the water to the polymer gel emulsion. Other forms of energy transfer could include any flexible wall shared between the water supply and polymer gel emulsion supply or other movable elements which move in response to water energy and act on the polymer gel emulsion to energize it. Such energy can be in the form of pressure, velocity, or a combination thereof, and also potential energy stored in a spring or other energy storage apparatus. The accumulator 40 in this exemplary embodiment has a movable element therein which moves responsive to flow of water into the inlet 42 of the accumulator 40. This movable element acts on polymer gel emulsion within the accumulator 40 to push polymer gel emulsion into the injection line 54 (and generally along arrow B from the storage 50 and along arrow E leading to the junction 25). Specific examples of such an accumulator 40 (FIG. 1) include the piston accumulator 70 (FIG. 6) and the flexible barrier accumulator 80 (FIG. 7).

The storage 50 is typically in the form of a tank which can be conveniently reloaded such as when the vehicle is at a base station on the ground. The storage 50 includes a valve 52, such as typically in the form of a check valve. This valve 52 keeps the storage closed and containing the polymer gel emulsion except when sufficient forces are exerted tending to pull (or push) polymer gel emulsion through the valve 52. In one embodiment, this valve 52 is generally in the form of a check valve which requires about one psi of lower pressure on the injection line 54 than in the storage 50 to cause the valve 52 to be opened.

Such a pressure differential can be caused by the accumulator 40 because the accumulator has the movable element contained therein biased toward the main line 22. This biasing within the accumulator causes the accumulator 40 to have its movable element move toward the main line 22, pressure is lowered on the outlet 44 side of the accumulator 40 which reduces pressure within the injection line 54 and downstream of the valve 52. Polymer gel emulsion is thus discharged from the storage (along arrow B of FIG. 1) and into the injection line 54, as well as into the accumulator 40 (either along the outlet 44 or along the feed 46).

Such passage of polymer gel emulsion into the accumulator 40 typically occurs after the polymer gel emulsion injection process has occurred and forces associated with water from the scooping intake 20 are no longer acting on the accumulator 40. With the cessation of such water forces, the biasing of the movable element within the accumulator 40 again becomes the dominate force within the system and causes the movable element within the accumulator 40 to move and for the associated drawing of polymer gel emulsion out of the storage 50 and into the accumulator 40. Such passage into the accumulator 40 of polymer gel emulsion can occur very slowly as there is plenty of time for the polymer gel emulsion to accumulate within the accumulator 40. While the storage 50 would typically hold polymer gel emulsion at ambient pressure, the storage 50 could be pressurized to some extent above (or below) ambient pressure if desired.

The injection line 54 leads to the junction 25 preferably through an injection valve 56. This injection valve 56 acts as another form of check valve to keep the polymer gel emulsion within the injection line 54, except when pressure within the injection line 54 is sufficient to cause injection flow of polymer gel emulsion toward the junction 25. In one embodiment, this check valve requires five psi of overpressure on the accumulator 40 side of the injection valve 56 to cause the injection valve 56 to open and for polymer to flow through the injection valve 56, and along the injection line 54 to the junction 25. Such flow occurs along arrow E through the injection valve 56 and along arrow F into the junction 25. Polymer gel emulsion thus tends to stay within the storage 50 and within the injection line 54, except when polymer gel emulsion is sufficiently energized to facilitate its rapid injection into the water at the junction 25. The injection valve 56 also prevents back flow of water into the polymer injection line 54.

This overpressure across the injection valve 56 which causes the polymer injection line 54 to have a higher pressure than the main line 22 can be provided in a variety of different ways. In one embodiment the storage 50 and the injection line 54 are all maintained at a pressure slightly greater than atmospheric pressure. The polymer gel emulsion is thus pre-pressurized somewhat. This enhanced pressure is not sufficiently great to cause opening of the injection valves 56, but provides some enhanced pressure so that the polymer gel emulsion will have a greater pressure than the water at the junction 25 when the accumulator 40 is activated by high pressure water at the inlet 42 of the accumulator 40. In another embodiment, the accumulator 40 is configured so that it has greater output pressure at the outlet 44 of the accumulator 40 than pressure at the inlet 42. For instance, the accumulator 40 can be configured as the piston accumulator 70 (FIG. 6) with an inlet chamber 72 spaced from an outlet chamber 76 and with diameters thereof different from each other so that a different pressure is provided at the outlet 44 of the accumulator 40 than at the inlet 42 of the accumulator 40.

Other embodiments to provide the necessary impetus to draw polymer gel emulsion from the injection line 54 into the main line 22 are also described in conjunction with the venturi system 100 and pump assisted system 200 (FIGS. 3 and 4) described in detail below. With such sufficient overpressure of the polymer gel emulsion within the injection line 54, the polymer gel emulsion passes through the junction 25 (along arrow F of FIG. 1) for mixing with water within the main line 22. The mixed flow then passes along the mixed supply line 62.

Preferably this mixed supply line 62 includes at least one elbow or some other high friction flow element. Polymer gel emulsion requires addition of a specified amount of water and sheer forces to be applied thereto so that the polymer gel emulsion is fully activated and combined with the water. Once so activated, it can be stored for some time with the water in an activated state and ready for use. Most preferably, at least two sharp 90° elbows are provided along the mixed supply line 62 between the junction 25 and the entrance 64 into the mixed product tank 60 so that the polymer gel emulsion and water are thoroughly mixed and activated before entry into the tank 60 (along arrow G of FIG. 1).

This tank 60 is preferably configured as a drop tank with doors or other openings which can rapidly open for exiting of the mixed product through the exit 66 (along arrow H of FIG. 1). With this system 10 depicted in FIG. 1 no external energy supply is required either for injection of polymer into the water or to provide forces to appropriately sheer the polymer and water for mixing and activation thereof. Rather, the forces required to achieve this dosing and mixing are all provided by hydrodynamic forces contained within the water as it rapidly enters the scooping intake 20 (along arrow A of FIG. 1) when the aircraft skims over the surface of a body of water. The power systems and a load capacity of the aircraft are thus optimized to maximize the effectiveness of the overall firefighting vehicle.

Figure 3:
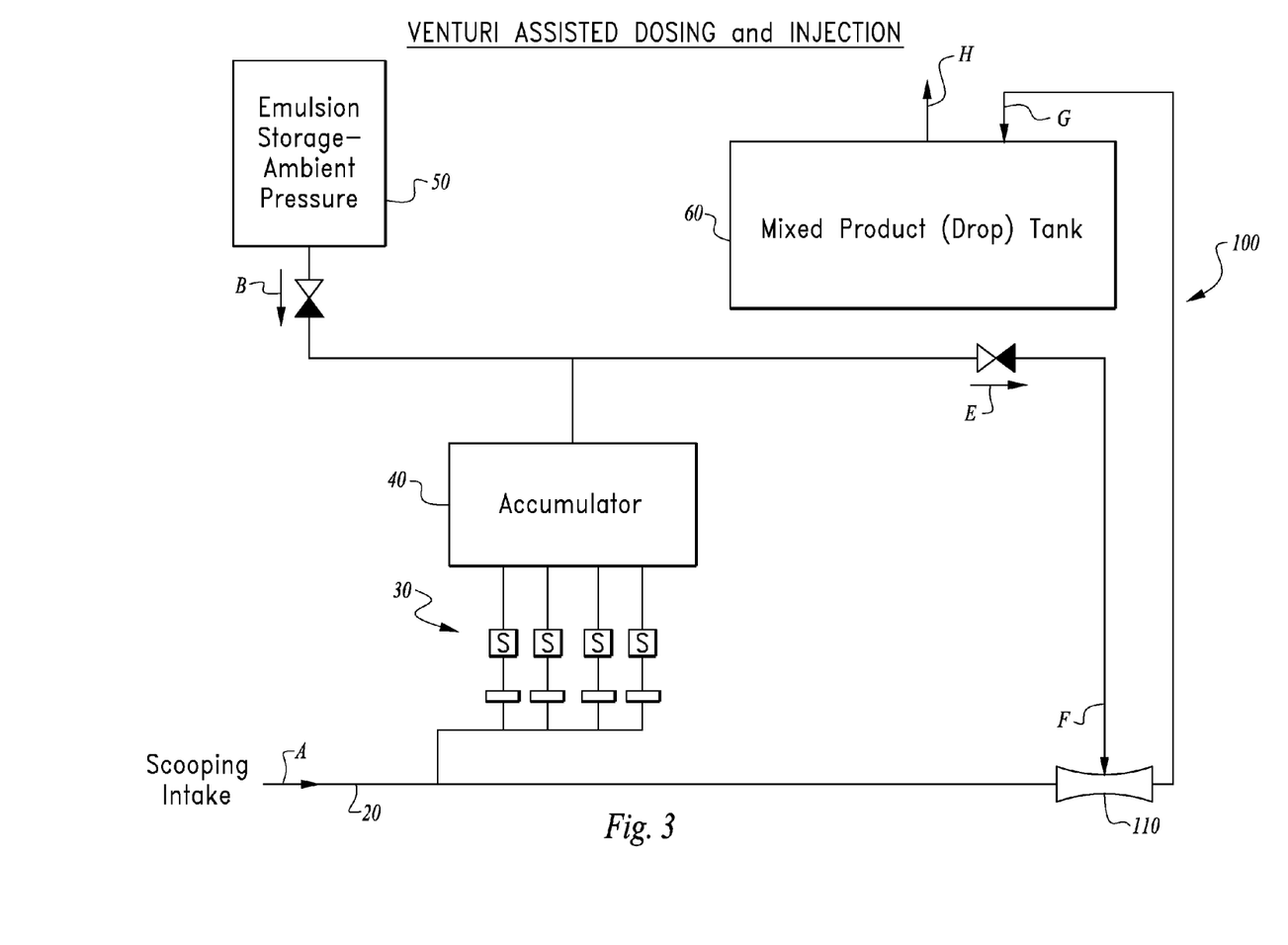
FIG. 3 is a schematic of an alternative embodiment of that which is shown in FIG. 1 using a venturi to assist the dosing and injection system of this invention.

With particular reference to FIG. 3, details of the venturi assisted dosing and injection system 100 are described as an alternative to the system 10 of FIG. 1. With the venturi assisted system 100, the preferred system 10 (FIG. 1) is followed except that a venturi valve 110 is provided at the junction where the polymer gel emulsion is joined with the water in the main line 22 (FIG. 1). The venturi 110 is configured so that the polymer gel emulsion enters the venturi 110 (along arrow F) in a direction transverse to flow of water into the venturi 110. If necessary, the venturi can have a cross-sectional area of this main line for the water decrease somewhat so that velocity is increased. Utilizing the venturi principle, as velocity increases, pressure decreases. This pressure decrease can be provided sufficient to draw the polymer gel emulsion from the polymer injection line 54 (FIG. 1) into the junction 25 (FIG. 1). Any injection valve 56 can be left the same or appropriately modified in the venturi assisted system 100 to control the system 100 and cause dosing of polymer gel emulsion to occur when desired. It is conceivable that the injection valve 56 might be dispensed with, the system 100 and venturi valve 110 acting alone to prevent or effectively discourage water flow into the injection line 54 or polymer gel emulsion flow from the injection line 54 into the junction 25, except when called for by pressurization of the accumulator 40.

Figure 4:
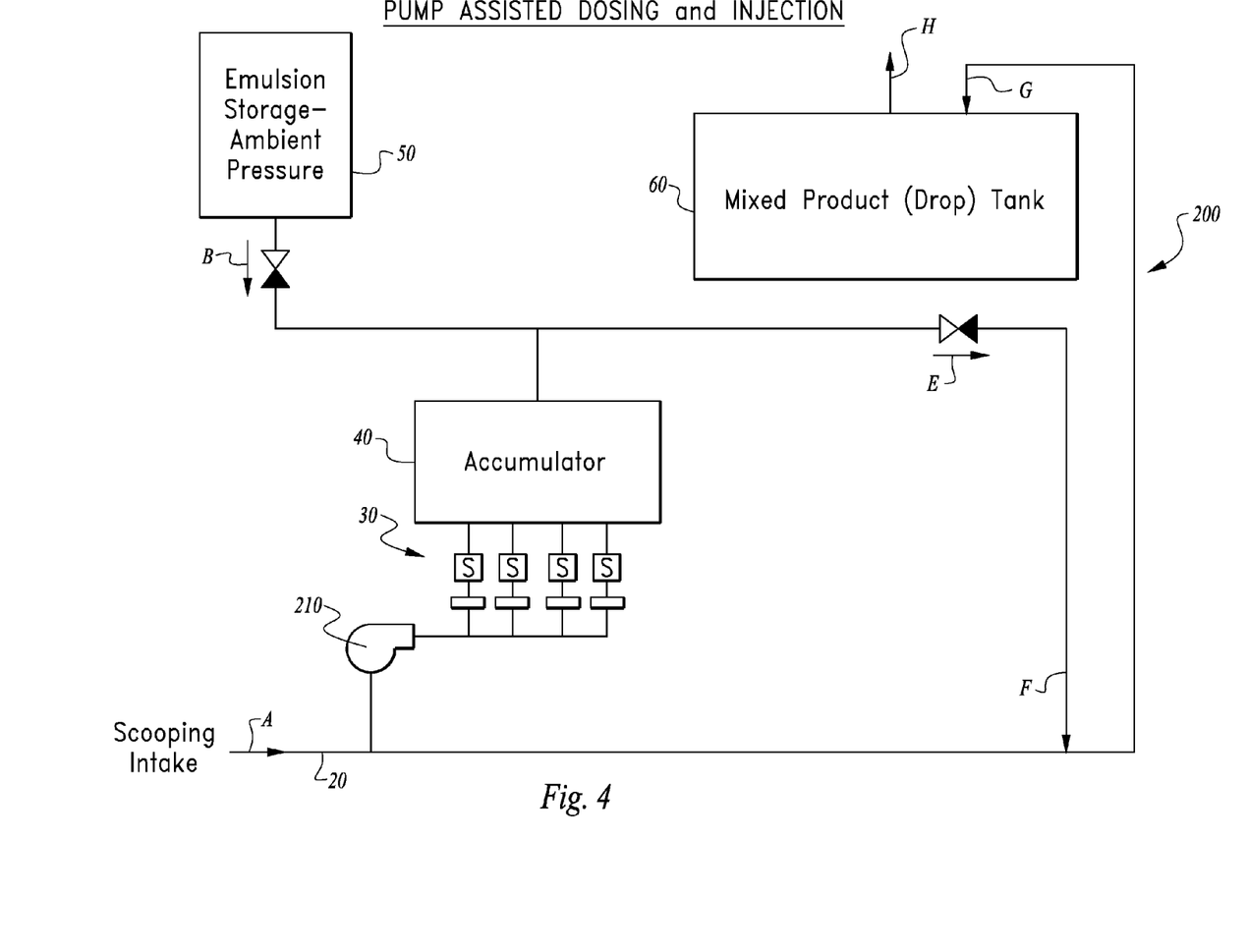
FIG. 4 is a schematic of an alternative embodiment of that which is shown in FIG. 1 where a pump is utilized to assist the dosing and injection system of this invention.

With particular reference to FIG. 4, details of the pump assisted dosing and injection system 200 are described as another alternative to the system 10 of FIG. 1. With the pump assisted system 200, a pump 210 is provided. This pump 210 is shown in FIG. 3 along the feed control line 24 (FIG. 1). As an alternative, this pump 210 could be provided along the injection line 54 (FIG. 1). The prior art polymer dosing and injection systems include a dosing pump. The pump 210 of this invention is unique in that it is a low head/high volume pump which does not provide all of the energy required for the dosing system. Rather, the accumulator 40 provides some of the required energy (and typically a majority of the required energy) and the pump 210 merely boosts the required energy so that the desired dosing injection can occur at the junction 25. The pump 210 can be controlled in a manner similar to other prior art dosing pumps, but with a lesser power requirement and a lesser size and associated weight required thereby.

Figure 5:
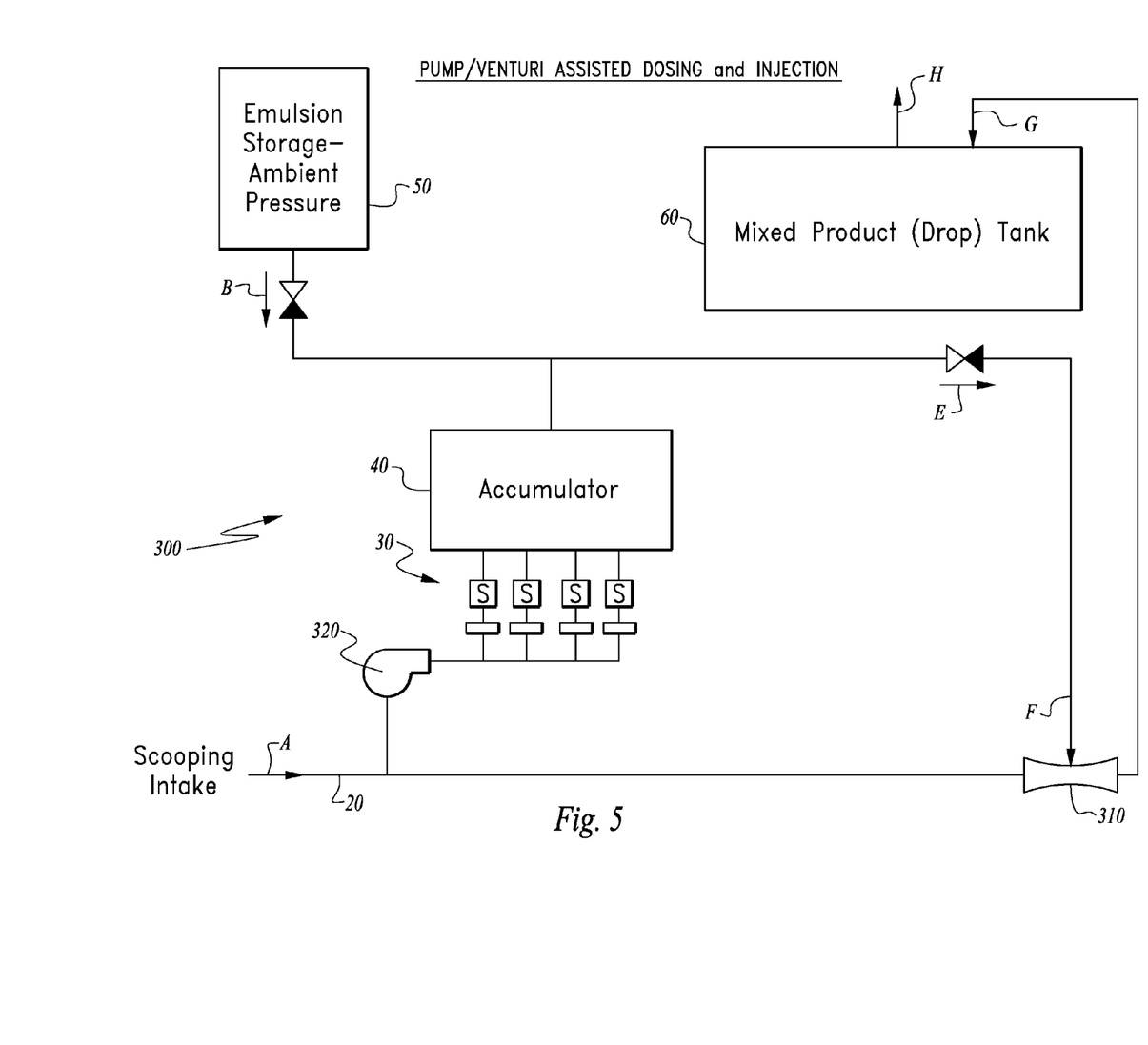
FIG. 5 is a schematic of an alternative of that which is shown in FIG. 1 which is a hybrid of the systems of FIGS. 3 and 4 where the dosing and injection system is assisted by both a venturi and a pump.

With particular reference to FIG. 5, details of a hybrid polymer dosing and injection system 300 are described. With the hybrid system 300, both a venturi valve 310 and a pump 320 are provided. With this hybrid system 300, the benefits of both the venturi valve 310 and pump 320 are provided in conjunction with the accumulator 40. A designer would have the flexibility to configure these various elements to optimize the particular design parameters of greatest importance to the designer.

With particular reference to FIG. 6, details of one form of accumulator 40 in the form of a piston accumulator 70, are described. The piston accumulator 70 is generally interposed between the control line 24 filled with water from the intake 20 and the injection line 54 filled with polymer gel emulsion. The piston accumulator 70 is thus interposed between the inlet 42 of the accumulator 40 and the outlet 44 of the accumulator 40.

The piston accumulator 70 includes an inlet chamber 72 on a water side thereof and an outlet chamber 76 on a polymer gel emulsion side thereof. These chambers 72, 76 could be part of a common enclosure, but typically are separate from each other. A first piston 73 resides within the inlet chamber 72. A second piston 77 resides within the outlet chamber 76. These pistons 73, 77 are joined together by a shaft 74 therebetween of elongate rigid form.

A spring 75 biases the pistons 73, 77 and shaft 74 toward the water side at the inlet 42. In the embodiment shown, the spring 75 is interposed between a reference wall between the chambers 72, 76 and the first piston 73. This spring 75 is configured as a compression spring. As an alternative, the spring 75 could abut against the second piston 77 and be a tension spring. This spring 75 could alternatively reference against other portions of the chambers 72, 76 or other reference structures. The spring 75 could be replaced with other resilient members (or biasing elements) which act to bias the pistons 73, 77 toward the inlet 42. One alternative biasing element would be to pressurize the area between the two pistons so that air pressure therein would bias the pistons 73, 77 toward the inlet 42.

The inlet chamber 72 preferably has a greater diameter than the outlet chamber 76, and with perimeters of the pistons 73, 77 being circular and configured with seals to prevent flow around the pistons 73, 77 relative to walls of the chambers 72, 76. The inlet chamber 72 having a larger diameter than the outlet chamber 76, a greater pressure is generated within the outlet chamber 76 than is present within the inlet chamber 72. In this way, the injection line 54 is pressurized to a pressure higher than pressure within the control line 24. Such overpressure assists in causing dosing of the polymer gel emulsion from the injection line 54 into the junction 25.

With particular reference to FIG. 7, details of a flexible barrier accumulator 80 are described, according to an alternative embodiment. The flexible barrier accumulator 80 is generally interposed between the inlet 42 and the outlet 44 of the accumulator 40 (FIG. 1). The flexible barrier accumulator 80 thus has one side accessed by water from the control line 24 and one side accessed by polymer gel emulsion from the injection line 54. A housing 82 will typically contain a substantially common pressure therein. A barrier 84 is fixed to walls of the housing 82 at an intermediate location between the water side and polymer gel emulsion side of the housing 82. This barrier 84 could be in the form of a flexible membrane, such as a rubber membrane. This barrier 84 could be in the form of a flexible metal structure or other material which is capable of flexing as well. The flexible barrier accumulator 80 keeps the water separate from the polymer gel emulsion but allows for pressure to be transferred from the water side to the polymer gel emulsion side through the flexible barrier accumulator 80.

Preferably, the barrier 84 is biased toward a position closer to the water side of the accumulator 80. Such biasing can be provided by a spring 86. As another alternative, the barrier 84 can be configured to have a shape such as a concave shape which has its natural biased shape extending toward the water side and the inlet 42. This biasing controls a position of the barrier 84 except when forces, such as hydrodynamic forces associated with the water, act on the barrier 84, causing the barrier 84 to move and for polymer gel emulsion to be pushed out of the outlet 44 and into the injection line 54. As an alternative to the flexible barrier 84, a rigid barrier could merely slide within the housing 82, such as in the form of a two sided piston sliding within the housing 82.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A system for energy efficient injection of polymer gel emulsion into water, the system comprising in combination:
    a water scooping intake oriented to route water into a main water line;
    a polymer gel emulsion storage having an injection line leading therefrom;
    said injection line joined to said main line at a junction;
    a mixed product tank located downstream of said junction, said tank adapted to hold and later release a mixture of water and polymer gel emulsion;
    an accumulator transferring hydrodynamic energy to the polymer gel emulsion in said injection line sufficient to assist polymer gel emulsion flow into said junction to join with the water from said main line;
    wherein said accumulator includes an inlet coupled to said main line and an outlet coupled to said injection line, and with a movable element between said inlet and said outlet; and
    wherein said accumulator includes an inlet chamber adjacent said inlet and an outlet chamber adjacent said outlet, said inlet chamber adapted to contain water therein, said outlet chamber adapted to contain polymer gel emulsion therein.

2. The system of claim 1 wherein said inlet chamber and said outlet chamber of said accumulator share a common housing with said movable element within said common housing defining a border between said inlet chamber and said outlet chamber.

3. The system of claim 2 wherein said movable element includes a flexible membrane.

4. The system of claim 3 wherein said flexible membrane is biased toward said inlet chamber.

5. The system of claim 4 wherein a spring is coupled to said flexible membrane and biasing said flexible membrane toward said inlet chamber.

6. The system of claim 1 wherein said movable element includes a first piston within said inlet chamber and a second piston within said outlet chamber, said first piston and said second piston coupled together such that movement of said first piston causes movement of said second piston.

7. The system of claim 6 wherein said first piston and said second piston are fixed together by a rigid elongate shaft.

8. The system of claim 7 wherein a spring is coupled to said moveable element biasing said movable element toward said inlet chamber.

9. The system of claim 6 wherein said first piston has a different diameter than said second piston.

10. The system of claim 1 wherein said junction includes a venturi configured to accelerate a flow rate of the water passing through said junction from said main line and with said injection line entering said venturi lateral to the water from said main line.

11. The system of claim 1 wherein a pump is interposed upstream of an inlet of said accumulator, said pump increasing a pressure of water ahead of said inlet of said accumulator.

12. The system of claim 1 wherein a control line extends from a source of water with hydrodynamic energy therein to an inlet of said accumulator, said control line including at least one flow volume control valve thereon adapted to control an amount of water passing into said inlet of said accumulator.

13. The system of claim 12 wherein a plurality of individual flow control valves are provided in parallel with each other, each of said flow control valves including a solenoid element for opening and closing and a flow rate control element adapted to control an amount of flow allowed through each solenoid.

14. The system of claim 1 wherein at least one flow control valve is interposed between an outlet of said accumulator and said injection line, said flow control valve controlling an amount of flow allowed out of said outlet of said accumulator and into said injection line.

15. A system for energy efficient injection of polymer gel emulsion into water, the system comprising in combination:
    a water scooping intake oriented to route water into a main water line;
    a polymer gel emulsion storage having an injection line leading therefrom;
    said injection line joined to said main line at a junction;
    a mixed product tank located downstream of said junction, said tank adapted to hold and later release a mixture of water and polymer gel emulsion;
    an accumulator transferring hydrodynamic energy to polymer gel emulsion in said injection line sufficient to assist polymer gel emulsion flow into said junction to join with the water from said main line; and wherein said tank is in the form of a drop tank which includes doors which open to drop a mixture of water and polymer gel emulsion, with said tank mounted to a fixed wing aircraft upon which said water scooping intake is also mounted.

16. A method for energy efficient injection of polymer gel emulsion into water, the method including the steps of:

providing an injection system including a water scooping intake oriented to route water into a main water line; a polymer gel emulsion storage having an injection line leading therefrom; the injection line joined to the main line at a junction; a mixed product tank located downstream of the junction, the tank adapted to hold and later release a mixture of water and polymer gel emulsion; and an accumulator transferring hydrodynamic energy to polymer gel emulsion in the injection line sufficient to cause polymer gel emulsion to flow into the junction and join with the water from the main line;

accumulating polymer gel emulsion within the accumulator;

scooping water into the main line;

powering the accumulator at least partially with hydrodynamic energy in the water to push polymer gel emulsion into the injection line;

joining the polymer gel emulsion with the water at the junction;

storing the mixed polymer gel emulsion and water within the tank; and exiting the mixture of polymer gel emulsion and water out of the tank.

17. The method of claim 16 including the further step of controlling an amount of polymer gel emulsion to be joined with the water during said joining step by placing at least one flow control valve upon either a water inlet of the accumulator or a polymer gel emulsion outlet of the accumulator.

18. The method of claim 16 including the further step of pumping water to a higher pressure upstream of the water inlet of the accumulator.

19. The method of claim 16 including the further step of assisting the joining step by configuring the junction as a venturi configured to accelerate the flow rate of water from the main line at the junction and bringing the polymer gel emulsion from the injection line into the junction lateral to the water flow in the junction.

20. A system for pressurizing a polymer gel concentrate injection line for injection of the polymer gel emulsion into water, comprising in combination:

a water scooping intake routing water into a main water line;

an injection line having polymer gel emulsion therein;

said injection line joined to said main line at a junction;

an energy transfer from water to polymer gel emulsion in said injection line sufficient to cause polymer gel emulsion to flow into said junction;

wherein said energy transfer includes an accumulator with an inlet coupled to said main line and an outlet coupled to said injection line, and with a movable element between said inlet and said outlet;

wherein said accumulator includes an inlet chamber adjacent said inlet and an outlet chamber adjacent said outlet, said inlet chamber containing water therein, said outlet chamber containing polymer gel emulsion therein; and wherein said movable element includes a first piston within said inlet chamber and a second piston within said outlet chamber, said first piston and said second piston coupled together such that movement of said first piston causes movement of said second piston.

21. The system of claim 20 wherein said energy transfer includes an accumulator with an inlet coupled to a water inlet separate from said water scooping intake and an outlet coupled to said injection line, and with a movable element between said inlet and said outlet.

22. The system of claim 20 wherein said junction includes a venturi configured to accelerate a flow rate of the water passing through said junction from said main line and with said injection line entering said venturi lateral to the water.

23. The system of claim 20 wherein a control line extends from said main line to an inlet of said energy transfer, said control line including at least one flow volume control valve thereon adapted to control an amount of water passing from said main line into said inlet of said energy transfer.

* * * * *